United States Patent
Tollis et al.

(10) Patent No.: US 12,051,137 B1
(45) Date of Patent: Jul. 30, 2024

(54) CHANNEL-BASED FRAMEWORK FOR HIERARCHICAL DRAWINGS

(71) Applicants: Ioannis G Tollis, Heraklion (GR); Giacomo Ortali, Pietralunga (GR)

(72) Inventors: Ioannis G Tollis, Heraklion (GR); Giacomo Ortali, Pietralunga (GR)

( * ) Notice: Subject to any disclaimer, the term of this patent is extended or adjusted under 35 U.S.C. 154(b) by 362 days.

(21) Appl. No.: 16/878,289

(22) Filed: May 19, 2020

Related U.S. Application Data

(63) Continuation of application No. 16/582,222, filed on Sep. 25, 2019, now abandoned, which is a continuation-in-part of application No. 16/003,288, filed on Jun. 8, 2018, now abandoned.

(51) Int. Cl.
  *G06T 11/20* (2006.01)
  *G06F 17/10* (2006.01)
  *G06T 11/60* (2006.01)

(52) U.S. Cl.
  CPC ............ *G06T 11/206* (2013.01); *G06F 17/10* (2013.01); *G06T 11/60* (2013.01)

(58) Field of Classification Search
  CPC ......... G06T 11/206; G06T 11/60; G06F 17/10
  USPC ......................................................... 382/100
  See application file for complete search history.

(56) References Cited

U.S. PATENT DOCUMENTS

| | | | | |
|---|---|---|---|---|
| 5,634,113 A | * | 5/1997 | Rusterholz | G06F 30/18 716/106 |
| 7,519,233 B2 | * | 4/2009 | White | G06T 11/206 382/293 |
| 2015/0019592 A1 | * | 1/2015 | Jin | G06F 16/9024 707/798 |
| 2017/0221240 A1 | * | 8/2017 | Stetson | G06T 11/206 |
| 2018/0122137 A1 | * | 5/2018 | Tian | G06V 20/653 |
| 2019/0197586 A1 | * | 6/2019 | Srivastava | G06F 16/24575 |
| 2019/0334779 A1 | * | 10/2019 | Woodward | G06F 16/9024 |

OTHER PUBLICATIONS

Ha-Nguyen Tran, Erik Cambria, Amir Hussain, Towards GPU-Based Common-Sense Reasoning: Using Fast Subgraph Matching, published on-line Aug. 8, 2016, Springer Science + Business Media, Cogn Comput (2106) vol. 8, pp. 1074-1086 New York 2016 (Year: 2016).*

(Continued)

*Primary Examiner* — William D Titcomb
(74) *Attorney, Agent, or Firm* — Useful Arts IP

(57) ABSTRACT

Methods for visualizing directed graphs and their hierarchies are provided that completely depart from known approaches. The methods compute readable hierarchical visualizations that contain the complete reachability information of a graph. In one embodiment, only the necessary edges are drawn in the drawing, thus reducing the visual complexity of the resulting drawing. The methods require only polynomial time. In one aspect, the vertices of the graph are (vertically) partitioned into paths/channels, having cross edges that connect various vertices in different paths/channels. A corresponding graph drawing method is implemented in principally two steps: (a) a cycle removal step (if the graph contains cycles) and (b) a channel decomposition and hierarchical drawing step. A corresponding framework may offer a suite of solutions depending on requirements, does not introduce any dummy vertices, and keeps the vertices of a path/channel vertically aligned.

13 Claims, 13 Drawing Sheets

(56) References Cited

OTHER PUBLICATIONS

Emden R. Gansner, Eleftherios Koutsofios, Stephen C. North, and Kiem-Phong Vo, A Technique for Drawing Directed Graphs, Mar. 1993, published IEEE Transactions on Software Engineering vol. 19, No. 3, pp. 214-230 (Year: 1993).*

Eades, Peter, and Nicholas C. Wormald. "Edge crossings in drawings of bipartite graphs." Algorithmica 11 (1994): 379-403.

Chen, Yangjun, and Yibin Chen. "On the dag decomposition." British Journal of Mathematics and Computer Science 10.6 (2015): 1-27.

Kuosmanen, Anna, et al. "Using minimum path cover to boost dynamic programming on DAGs: co-linear chaining extended." Research in Computational Molecular Biology: 22nd Annual International Conference, RECOMB 2018, Paris, France, Apr. 21-24, 2018, Proceedings 22. Springer International Publishing.

Sugiyama, Kozo, Shojiro Tagawa, and Mitsuhiko Toda. "Methods for visual understanding of hierarchical system structures." IEEE Transactions on Systems, Man, and Cybernetics 11.2 (1981): 109-125.

* cited by examiner

CHANNEL-BASED FRAMEWORK FOR HIERARCHICAL DRAWINGS

BACKGROUND

The visualization of directed (often acyclic) graphs is very important for many applications in several areas of research and business. This is the case because such graphs often represent hierarchical relationships between objects in a structure (the graph). A four-phase framework has been described for producing hierarchical drawings of directed graphs. This framework is known in the literature as the "Sugiyama" framework or algorithm. (K. Sugiyama, S. Tagawa, and M. Toda. Methods for visual understanding of hierarchical system structures. IEEE Trans. Systems, Man, and Cybernetics, 11(2):109-125, 1981.) Almost all problems involved in various phases of the Sugiyama framework are NP-hard, meaning that computation time is not well-bounded.

Other pertinent references concerning the Sugiyama framework or algorithm include the following:

[DETT99] G. Di Battista, P. Eades, R. Tamassia, and I. G. Tollis. *Graph Drawing: Algorithms for the Visualization of Graphs*. Prentice-Hall, 1999.

[CC14] Yangjun Chen and Yibin Chen. On the DAG decomposition. *British Journal of Mathematics and Computer Science*, 2014. 10(6): 1-27, 2015, Article no.BJMCS.19380, ISSN: 2231-0851.

[EW94] P. Eades and N. C. Wormald. Edge crossings in drawings of bipartite graphs. *Algorithmica*, 11(4):379-403, 1994.

[J90] H. V. Jagadish. A compression technique to materialize transitive closure. *ACM Trans. Database Syst.*, 15(4):558 598, 1990.

[KW01] M. Kaufmann and D. Wagner. *Drawing Graphs: Methods and Models*. Springer, 2001.

[KPG+18] A. Kuosmanen, T. Paavilainen, T. Gagie, R. Chikhi, A. I. Tomescu, and V. Makinen. Using minimum path cover to boost dynamic programming on DAGs: Co-linear chaining extended. In *Research in Computational Molecular Biology-22nd Annual International Conference, RECOMB 2018, Paris, France, Apr. 21-24, 2018, Proceedings*; pages 105-121.

[NH14] N. S. Nikolov and P. Healy. Hierarchical Drawing Algorithms in *Handbook of Graph Drawing and Visualization*, ed. Roberto Tamassia. CRC Press, 2013; pages 409-453.

BRIEF DESCRIPTION OF THE DRAWING FIGURES

The present invention may be further understood from the following description in conjunction with the appended drawing figures. In the drawing:

FIG. 3 is one variant of the graph drawing of FIG. 2.

FIG. 4 is a variant of the graph drawing of FIG. 2.

DETAILED DESCRIPTION

Summary

Figure 1:
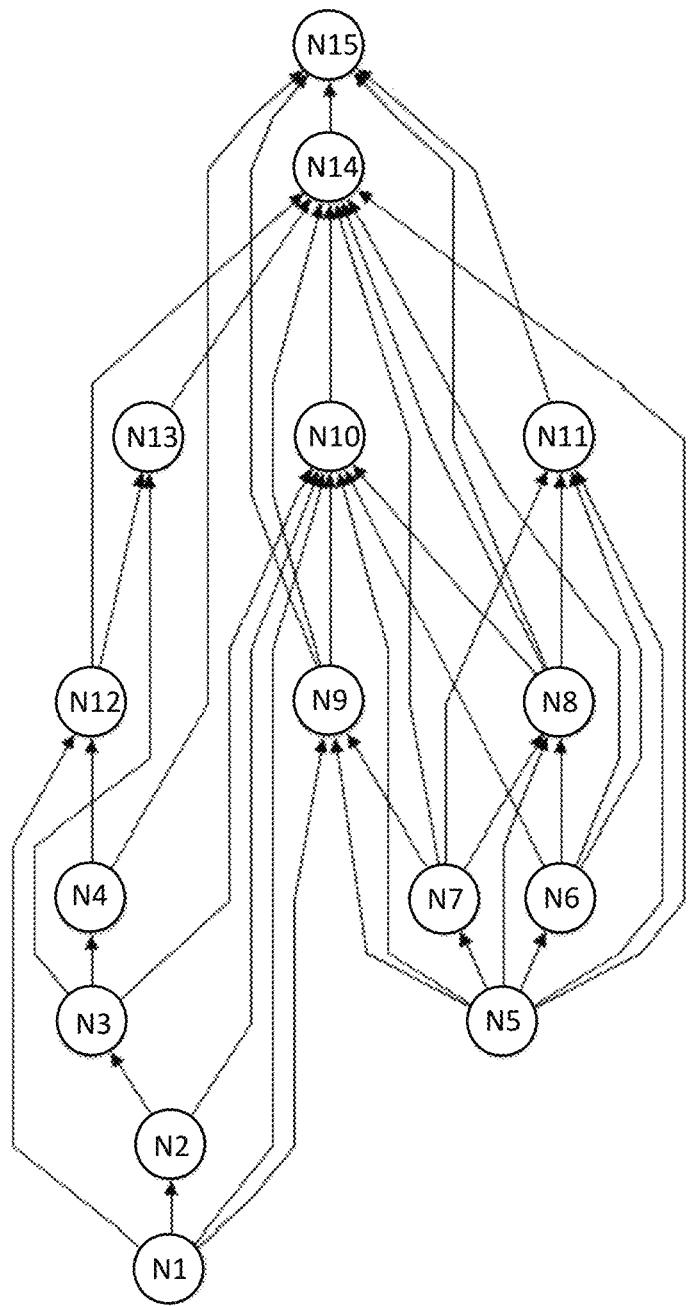
FIG. 1 is a drawing of a first example of a directed graph G computed by the graph drawing software Torn Sawyer Perspectives from Torn Sawyer Software that follows the Sugiyama framework.

Methods for visualizing directed graphs and their hierarchies are provided that completely depart from known approaches. The methods compute readable hierarchical visualizations that contain the complete reachability information of a graph. In one embodiment, only the necessary edges are drawn in the drawing, thus reducing the visual complexity of the resulting drawing. The methods require only polynomial time. In one aspect, the vertices of the graph are partitioned into paths/channels, haying cross edges that connect various vertices in different paths/channels, A corresponding graph drawing method is implemented in principally two steps: (a) a cycle removal step (if the graph contains cycles) and (b) a channel decomposition and hierarchical drawing step A corresponding framework may offer a suite of solutions depending on requirements, does not introduce any dummy vertices, and keeps the vertices of a path/channel vertically aligned. The new technique can be viewed as "orthogonal" to the old approaches, since it partitions the (vertices of the) graph vertically, whereas the old techniques partition the (vertices of the) graph horizontally.

in one embodiment, a computer implemented graph drawing method for producing a hierarchical drawing of a directed graph in which vertices of the graph are decomposed into paths/channels and cross edges connect various vertices in different paths/channels includes: (a) if the graph contains cycles, removing the cycles; and (b) performing a channel decomposition and hierarchical drawing step. Vertices of a path/channel may be kept vertically aligned; wherein a path is defined from each vertex in the path/channel to all vertices that are at higher y-coordinates. User-defined paths may be drawn vertically aligned. No cross-edge e=(u,v) intersects a vertex different from u and v in the hierarchical drawing. No dummy vertices need be introduced. Reachability information between vertices may be represented by traversing at most one cross edge. Each cross edge may have at most one bend.

An area of the hierarchical drawing may be O(kn) and may be bounded by a rectangle of height n-1 and width O(k), where k is typically a constant or small fraction of n. A number of crossings between cross edges and paths/channels may be minimized in $O(k!k^2)$ time. Total time complexity of the graph drawing method is $O(km)$.

Description

The Sugiyama framework for producing hierarchical drawings of directed graphs consists of four main phases: (a) Cycle Removal, (b) Layer Assignment, (c) Crossing Reduction, and (d) Horizontal Coordinate Assignment. The reader can find the details of each phase and several proposed algorithms to solve various of their problems and subproblems in Chapter 9 of the Graph Drawing book of [DETT99]. Other books have also devoted significant portions of their Hierarchical Drawing Algorithms chapters to the description of this framework, including [KW01, NH14].

Even though this framework is very popular, it has several limitations. As discussed above, most problems and subproblems that are used to optimize the results of each phase have turned out to be NP-hard. Several of the heuristics employed to solve these problems give results that are not bounded by any approximation. Additionally, the required manipulations of the graph often substantially increase the complexity of the graph itself. For example, if $G=(V,E)$ is a directed graph with n vertices and m edges, the number of dummy vertices produced in phase (b) of the Sugiyama framework can be as high as $O(nm)$. The overall time complexity of this framework (depending upon implementation) can be as high as $O(n^2m^2)$, using simple heuristics, or higher if one chooses more sophisticated heuristics, or algorithms that require exponential time.

Moreover, an important limitation of this framework is the fact that the heuristic solutions and decisions that are made during previous phases (e.g., layer assignment, crossing reduction, etc.) will influence severely the results obtained in later phases. However, previous decisions cannot be changed in order to obtain better results. Referring to FIG. 1, a drawing is shown of a first example of a directed graph G computed by the graph drawing software Tom Sawyer Perspectives from Tom Sawyer Software that follows the Sugiyama framework. The steps of the Sugiyama framework are illustrated in FIG. 5.

Given a directed graph $G=(V,E)$ with n vertices and m edges, a hierarchical drawing of G requires that all edges are drawn in the same direction (upward, downward, rightward, or leftward) monotonically. If G contains cycles this is clearly not possible, since in any hierarchical drawing of the graph some edges have to be oriented backwards.

Figure 5:
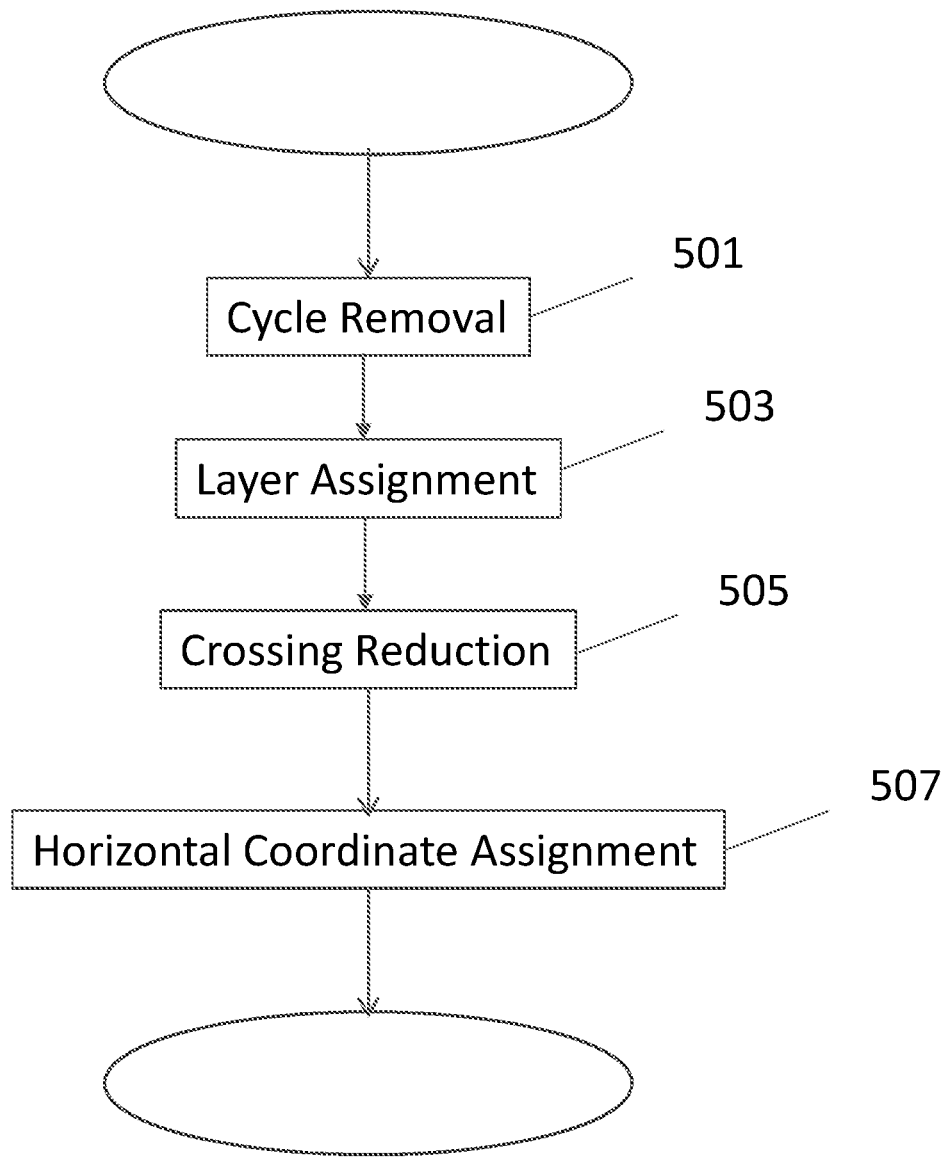
FIG. 5 is a flowchart illustrating steps of the Sugiyama graph drawing method.

Referring to FIG. 5, in a cycle removal phase 501, any cycles of the graph are removed, using known techniques. The Sugiyama framework contains the Cycle Removal Phase in which a (small) subset of the edges is selected and the direction of these edges is reversed, so that no cycles remain in G. Since it is important to maintain the character of the input graph, the number of the selected edges has to be minimum. This is a well-known NP-hard problem, called the Feedback Arc Set problem. A well-known approximation algorithm, called Greedy-Cycle-Removal, runs in linear time and produces sets that contain at most m/2-n/6 edges. If the graph is sparse, the result is further reduced to m/3 edges [DETT99].

In a Layer Assignment Phase 503 of the Sugiyama framework the vertices are assigned to a layer and the layering is made proper, see [DETT99, NH14]. In other words, long edges that span several layers are broken down into many smaller edges by introducing dummy vertices, so that every edge that starts at a layer terminates at the very next layer. Clearly, in a graph that has a longest path of length $O(n)$ and $O(m)$ transitive edges, the number of introduced dummy vertices can be as high as $O(nm)$. This fact will impact the running time (and space) of all subsequent phases, with heaviest impact on the next phase, the Crossing Reduction Phase.

The Crossing Reduction Phase 505 is perhaps the most difficult and most time-consuming phase and has attracted a lot of attention both by mathematicians and computer scientists. It is outside the scope of this application to describe the various techniques for crossing reduction, however, the reader may see [DETT99, NH14] for further details.

The most popular technique for crossing reduction is the Layer-by-Layer Sweep, [DETT99, NH14], and it solves multiple instances of the well-known Two-Layer-Crossing Problem, by considering the layers in pairs going up (or down). Of course, a solution for a specific two-layer crossing problem "fixes" the relative order of the vertices (real and dummy) for the next two-layer crossing problem, and so on. Therefore, "bad" choices may propagate. Additionally, each two-layer crossing problem is NP-complete [EW94]. The heuristics employed in this phase tend to reduce crossings using various techniques, but notice that the number of crossings may be as high as $O(M'^2)$, where M' is the number of edges between the vertices of two adjacent layers.

Finally, in the last phase 507, Horizontal Coordinate Assignment, the (exact) x-coordinates of the vertices are computed by quadratic-programming or other techniques [DETT99, NH14], which require considerable computational resources. The dummy vertices are replaced by bends. This implies that the number of bends is about equal to the number of dummy vertices (except when the edge segments are completely aligned).

The framework described herein for visualizing directed graphs and their hierarchies departs completely from the typical Sugiyama framework and its four phases. The framework computes readable hierarchical visualizations that contain the complete reachability information of a directed graph. In one embodiment, the vertices of the graph are partitioned into channels (and/or paths) and cross edges are provided that connect various vertices in different channels. Therefore, the new framework can be considered as orthogonal to the Sugiyama framework in the sense that the Sugiyama framework partitions the vertices of the graph horizontally into layers, whereas the new framework partitions the vertices vertically into channels or paths.

Figure 6:
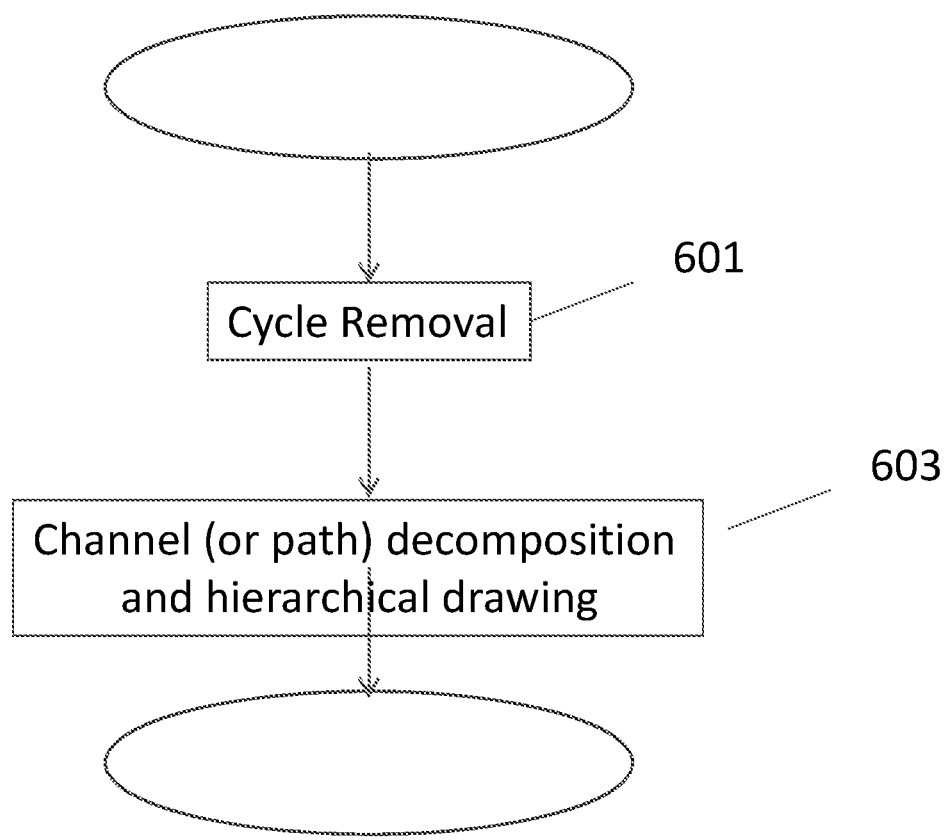
FIG. 6 is a flowchart illustrating steps of the present graph drawing method.

Referring to FIG. 6, in one embodiment, the present graph drawing method may require only two steps: a cycle removal step 601 (if the directed graph contains cycles); and a channel (or path) decomposition and hierarchical drawing step 603.

In the cycle removal step 601, similar work is performed as in step 501 previously described. Since the input graph G may contain cycles, the present framework also needs to remove or absorb them. One approach is to use a cycle removal method similar to Sugiyama's first step in which the direction of a subset of edges is reversed. One drawback to this approach, however, is that a reversed edge will be a transitive edge in the new graph and hence it may significantly affect the resulting drawing. Another drawback is that, since the choice of the edges to be reversed is done without any knowledge of the topology of the graph, it is often the case that nodes that should be placed close to each other (because they belong to a cycle) are finally placed very far from each other because the reversed edge is typically a long transitive edge. As a result, the removal and/or reversal of such edges will create a graph that will have a "different character" than the original graph, To avoid these undesired results, a different approach is taken: instead of reversing the edges, they are removed. In accordance with a further aspect, if the input graph does not contain long cycles, the following approach may be used: (a) find the Strongly Connected Components (SCC) of the graph in linear time; and (h) cluster and collapse each SCC into a supernode, and then the resulting graph G' will be acyclic. The latter technique is able to better preserve the character of the original input graph (and its cycles), but is not be very useful if most vertices of a graph are included in a very long cycle.

Assume that the given graph is acyclic after using either of the techniques described above. Additionally, without loss of generality, assume that the graph is an st-graph having one source s and one sink t. If the original graph has several sources and sinks, a new vertex may be introduced, called the super source, that is then connected to all sources with directed edges. Similarly, a new vertex may be introduced, called the super sink, that is then connected to all sinks.

In step 603, the vertices of a graph G are partitioned (vertically) into channels (or paths), called a channel- (or path-) decomposition of G. After the vertices of G are partitioned into paths/channels, a "new" graph Q is computed which is closely related to G and has the same reachability properties as G. The new graph consists of the vertices of G, the path/channel edges that connect vertices that are consecutive in the same path/channel, and cross edges that connect vertices that belong to different paths/channels. This framework can draw either (a) graph G without the transitive edges between path/channel vertices, or (b) a condensed form of the transitive closure of G. A hierarchical drawing of Q is computed. Since Q has the same reachability properties as G, this drawing contains most edges of G and provides all the reachability information of G. The "missing" incident edges of a vertex can be drawn interactively. For example, the full graph can be drawn interactively on demand by placing the cursor on top of any node and its incident edges will appear at once with a specified color and style.

Figure 2:
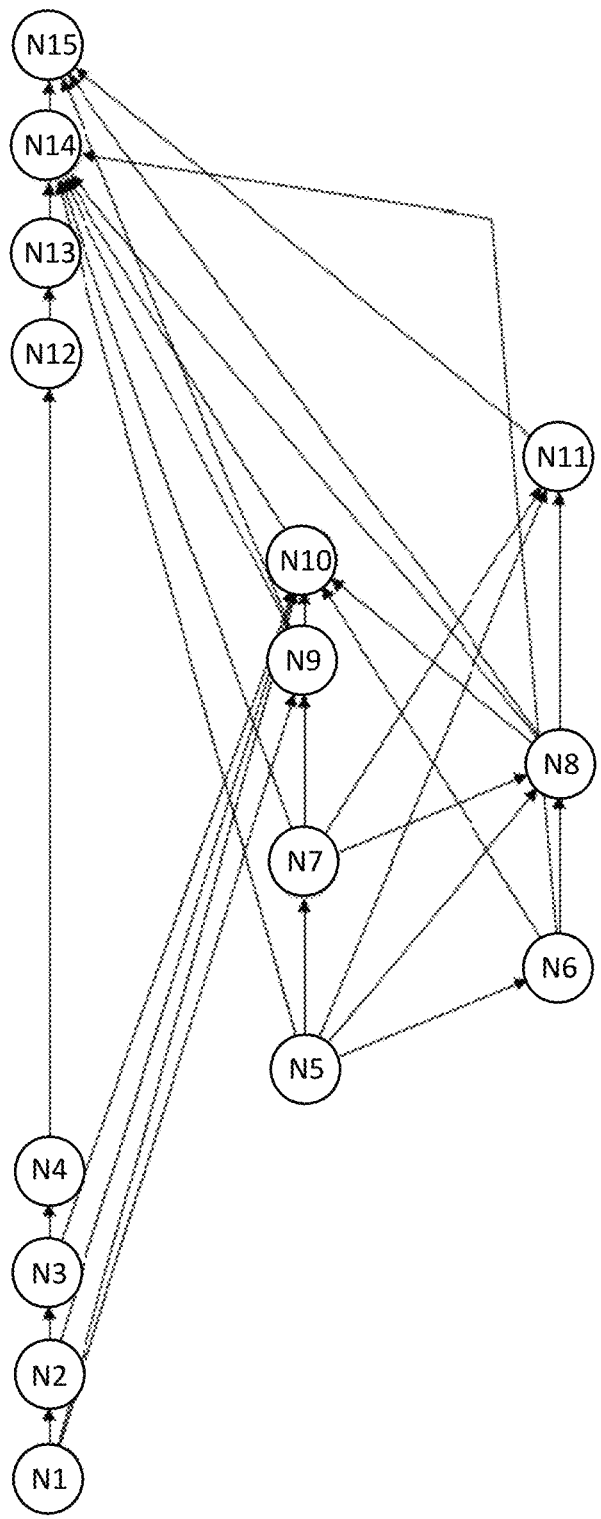
FIG. 2 is a drawing of the directed graph G1 of FIG. 1 using methods described herein.
Figure 3:
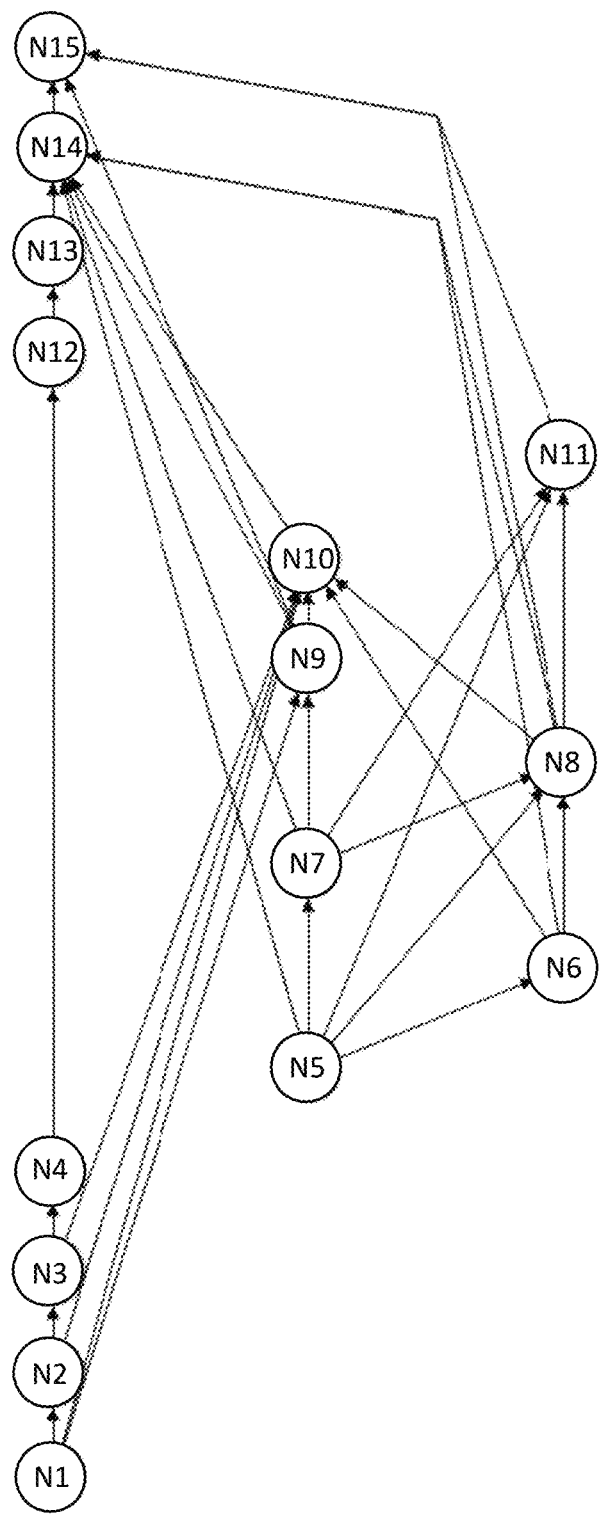
FIG. 3 is a first variant of the graph drawing of FIG. 2 in which the number of transitive cross edges shown is reduced in order to simplify the drawing.
Figure 4:
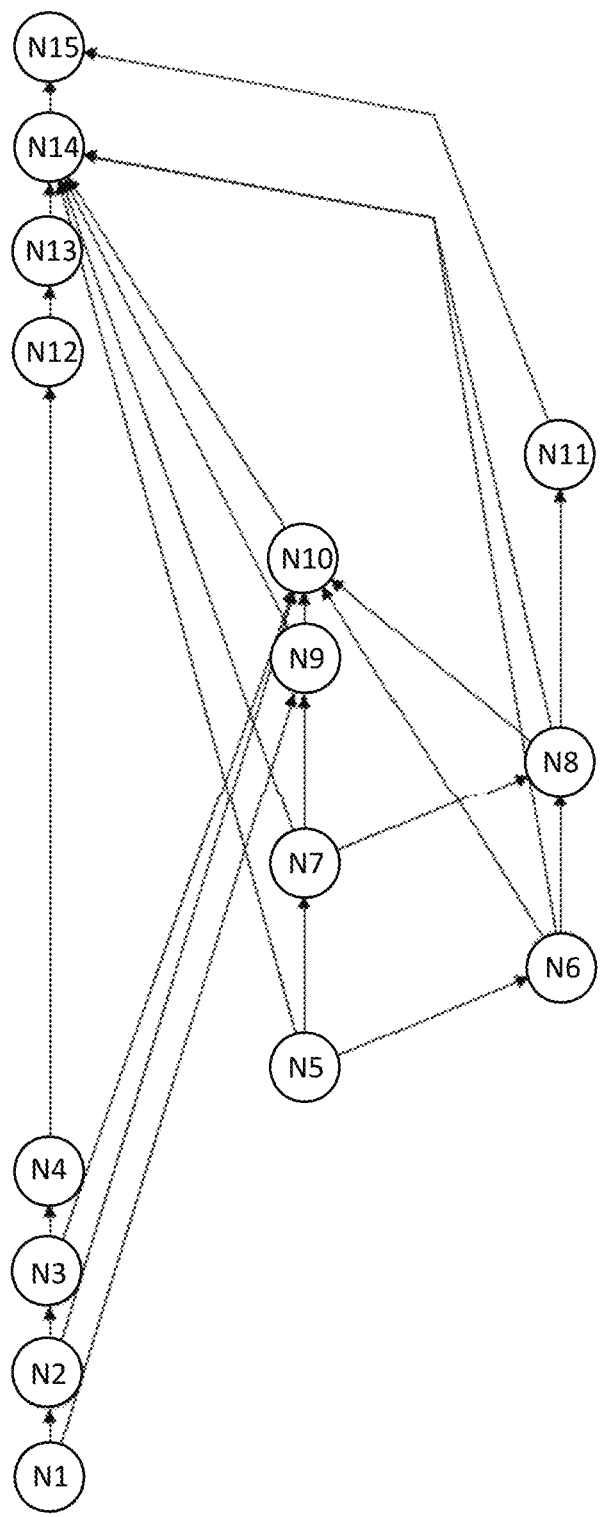
FIG. 4 is another variant of the graph drawing of FIG. 2.

FIG. 2. shows an equivalent graph as that of FIG. 1, drawn using present methods. FIG. 3 and FIG. 4 show variants of the graph of FIG. 2, in which the number of transitive cross edges shown is reduced to simplify the drawing.

Path Decomposition (Step 603)

Let G=(V,E) be a DAG (Directed Acyclic Graph). Since it is more intuitive, we will describe the process by defining a path decomposition (instead of a channel decomposition) of G: it is a set of vertex-disjoint paths $S_p=\{P_1,\ldots,P_k\}$ such that V ($P_1$), ..., V ($P_k$) is a partition of V (G). A path $P_h \in S_p$ is called a decomposition path. The vertices in a decomposition path are clearly ordered in the path, and with the notation $v_i^j$ indicating the fact that v is the jth vertex of path $P_i$. The path decomposition graph, or simply path graph, of G associated with path decomposition $S_p$ is a (reduced) graph H=(V,A) such that e=(u,v) ∈ A if and only if e ∈ E and (a) u,v are consecutive in a path of $S_p$ (called path edge) or (b) u and v belong to different paths (called cross edge). In other words, an edge of H is either a path edge if it connects two consecutive vertices of the same decomposition path, else it is a cross edge. Notice that the edges belonging to G but not to H are transitive edges between vertices of the same path of G.

A channel decomposition is defined similarly: A channel C is an ordered set of vertices such that any vertex u ∈ C has a path to each of its successors in C. In other words, given any two vertices v,w ∈ C, v precedes w in the order of channel C if and only if w is reachable from v in G. A channel can be seen as a generalization of a path, since a path is always a channel, but a channel may not be a path. A channel decomposition $S_c=\{C_1,\ldots,C_k\}$ is a partition of the vertex set V of the graph into channels. An optimum channel decomposition may be preferred over an optimum path decomposition only when the number of channels is significantly lower than the number of paths of an optimum path decomposition.

As a result of the decomposition, all vertices of each path/channel are assigned the same x-coordinate, while they are placed in successive y-coordinates following some ordering (say, a topological ordering). Therefore, the vertices of each path/channel are vertically aligned.

In order to complete the drawing of the graph, cross edges need to be drawn. Details of one method of drawing the cross edges is as follows.

Method for Path-Based Hierarchical Drawings (Step 603)

A method PB-Draw computes a path-based hierarchical drawing (or simply path-based drawing) Γ of G such that every cross edge of G bends at most once. Denote by $X(P_h)$ the x-coordinate of Path $P_h$ and by X(v), Y (v) the x-coordinate and the y-coordinate of any vertex v. Let $P_v$ be the path of $S_p$ containing v, then $X(v)=X(P_v)$. Suppose that the vertices of G are topologically ordered and let T(v) be the position of v in a topological order of G. PB-Draw associates to every path, and consequently to every vertex of the path, an x-coordinate that is an even number and to every vertex a y-coordinate that corresponds to its topological order, i.e., Y (v)=T(v) (Steps 1-4 below). The algorithm draws every cross edge e=(u,v) as a straight line if the drawn edge does not intersect a vertex w different from u and v in Γ (Steps 5-7 below). Otherwise it draws edge e with one bend $b_e$ such that: its x-coordinate $X(b_e)$ is equal to X(u)+1 if X(u)<X(v), or X(u)−1 if X(u)>X(v). The y-coordinate of bend be Y (be) is equal to Y (v)−1 (Steps 8-14).

PB-Draw(G=(V,E), $S_p=\{P_1,P_2,\ldots,P_k\}$, H=(V,A))

1. For i=0 to k−1 do
2. $X(P_i)=2_i$
3. For any v ∈ V
4. (X(v),Y (v))=($X(P_v)$,T(v))
5. For any e=(u,v) ∈ A
6. If the straight-line drawing of e does not intersect a vertex different from u,v:
7. Draw e as a straight line
8. Else:
9. If X(u)<X(v):
10. $X(b_e)$=X(u)+1
11. Else:
12. $X(b_e)=X(u)-1$
13. $Y(b_e)$=Y (v)−1
14. Draw e with one bend at point (X(be),Y (be))

Figure 7A:
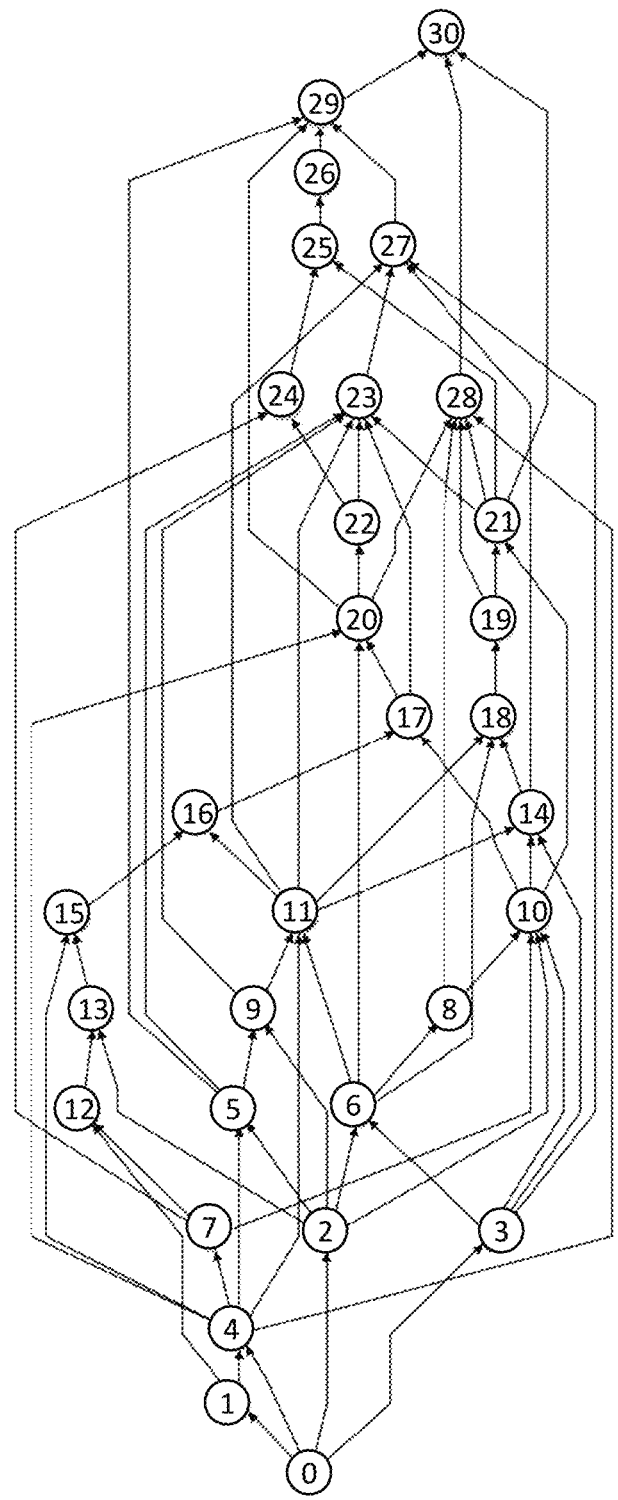
FIG. 7A is a drawing of a directed acyclic graph G2 computed by Tom Sawyer Perspectives from Tom Sawyer Software.
Figure 7B:
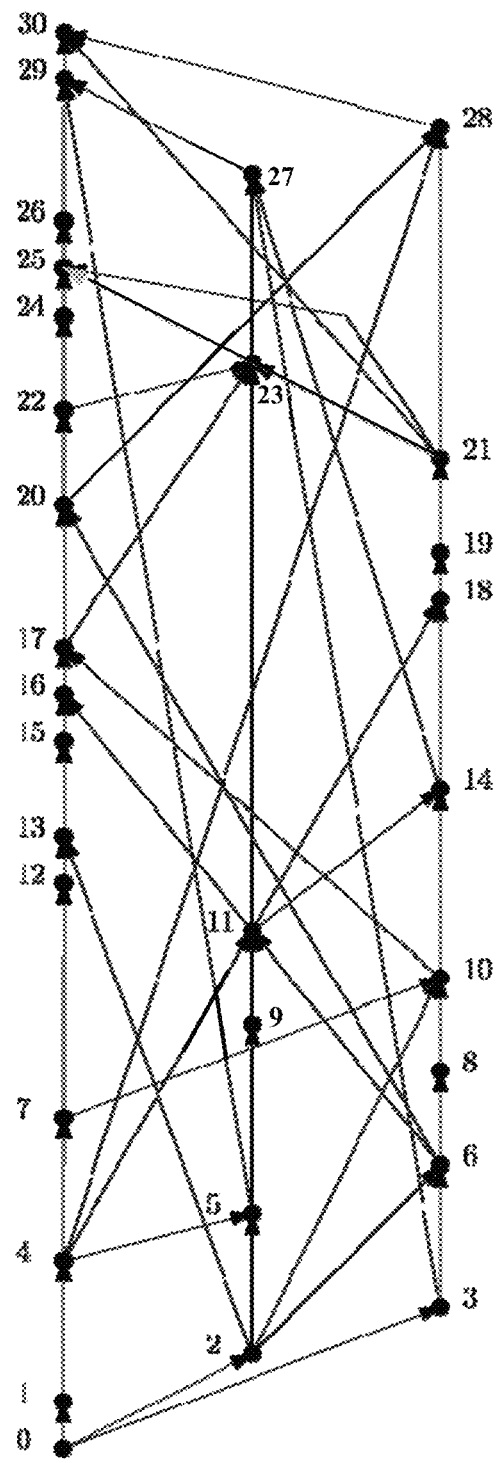
FIG. 7B is a path-based drawing of the graph of FIG. 7A in accordance with present methods.

FIG. 7A shows a drawing of a graph G as computed by Tom Sawyer Perspectives from Tom Sawyer Software that follows the Sugiyama framework. FIG. 7B shows the drawing F, that has only one bend, of H computed by Algorithm PB-Draw. The path decomposition that we used to compute the drawing is $S_p=\{P_1,P_2,P_3\}$, where:

$P_1$={0,1,4,7,12,13,15,16,17,20,22,24,25,26,29,30};
$P_2$={2,5,9,11,23,27}; $P_3$={3,6,8,10,14,18,19,21,28}.
Edge e=(21,25) is the only one bending. In grey we show edge e drawn as straight line, intersecting vertex 23.

Any drawing Γ computed by Algorithm PB-Draw has several interesting properties.

(a) The area of Γ is typically less than $O(n^2)$. By construction, Γ has height n-1 and width of 2k-1. Hence Area(Γ)=$O(kn)$.

(b) Given $S_p$ and the topological order of the vertices of G, every vertex needs $O(1)$ time to be placed.

(c) Every edge e=(u,v) needs $O(k)$ time to be placed, since before drawing it we need to check if its straight-line drawing would intersect a vertex different from u,v (Step 6). Since the drawing of e must be monotonous, it can intersect at most one edge per path; accordingly, a check is made to see if, in correspondence of every path placed between the path of u and v in Γ, the drawing of e intersects some vertex.

Figure 8A:
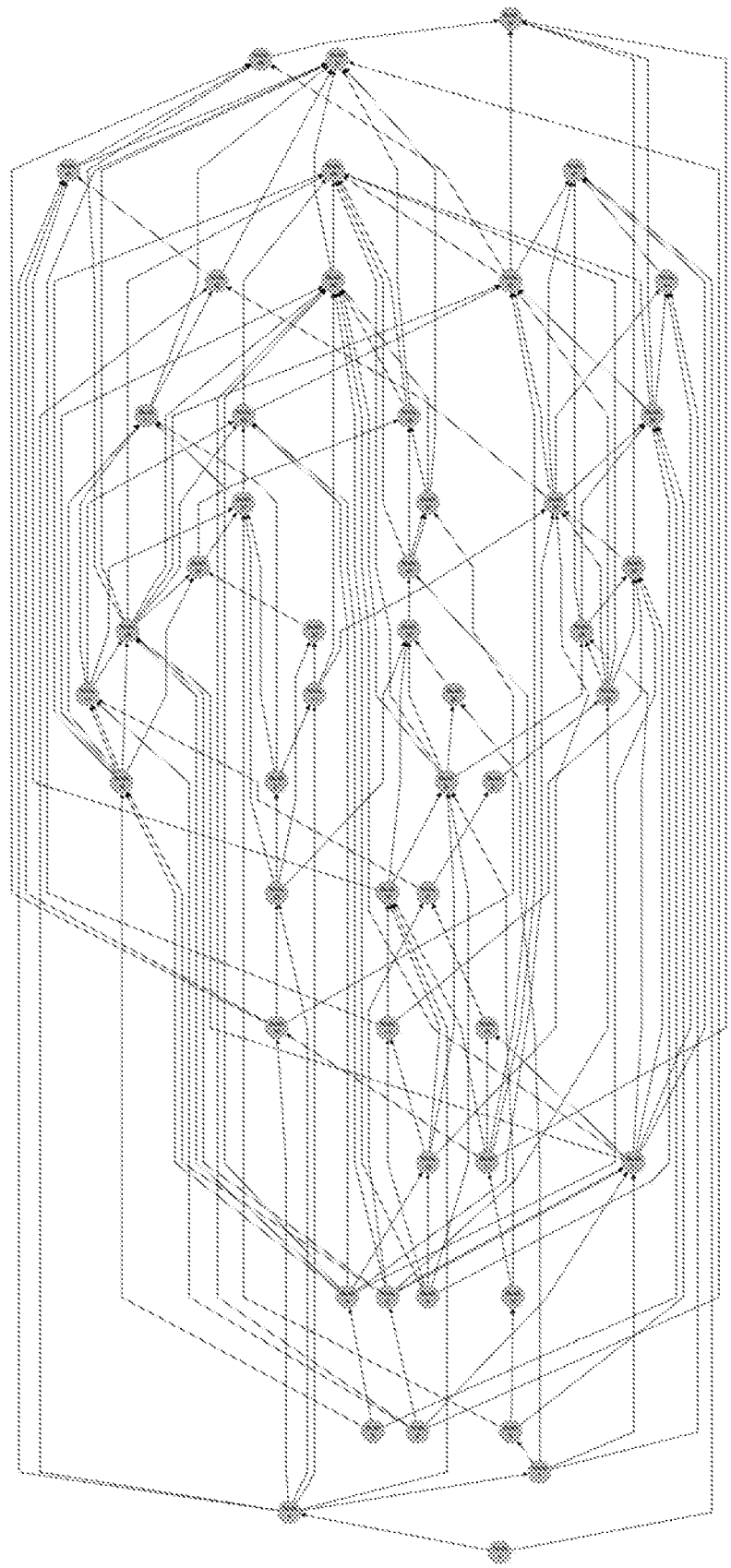
FIG. 8A is a drawing of a directed acyclic graph G3 computed by Tom Sawyer Perspectives from Tom Sawyer Software.
Figure 8B:
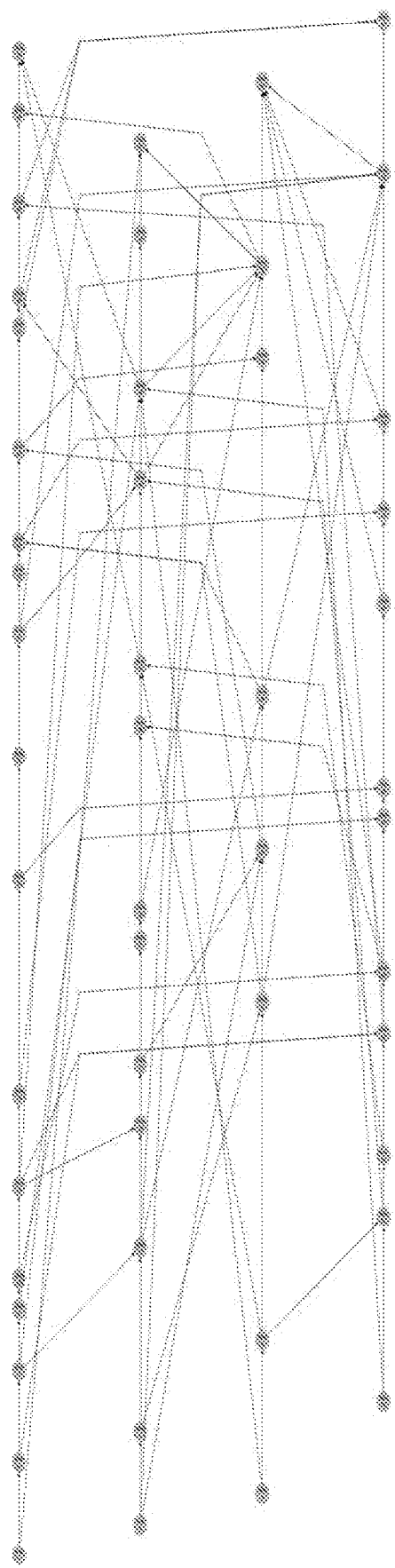
FIG. 8B is a path-based drawing of the graph of FIG. 8A in accordance with present methods; all cross edges adjacent to two vertices belonging to two different and not-consecutive channels are drawn with one bend.

Examples of larger graphs drawn using PB-Draw are shown in FIG. 8A and FIG. 8B.

Method for Channel-Based Hierarchical Drawings (Step 603)

A channel-based hierarchical drawing (or simply channel-based drawing) of G is defined (and constructed) in a similar fashion as the path-based drawing of G above. Notice that, since the channel is a generalization of a path, the concepts of channel decomposition graph and channel-based drawing are a generalization of the concepts of path decomposition graph and path-based drawing. Method CB-Draw in a similar fashion as method PB-Draw, and its pseudocode is similar. However, method CB-Draw takes as input a channel decomposition instead of a path decomposition and that its output is a channel-based drawing instead of a path-based drawing. The pseudocode of method CB-Draw, in accordance with one embodiment, is as follows:

CB-Draw($G=(V,E)$, $S_c=\{C_1,C_2,\ldots,C_K\}$, $H''=(V,A'')$

1. For i=1 to k do
2. $X(P_i)=2i$
3. For any v ∈ V
4. $(X(v),Y(v))=(X(C_v),T(v))$
5. For any e=(u,v)Γ A"
6. If the straight-line drawing of e does not intersect a vertex different from u,v:
7. Draw e as a straight line
8. Else:
9. If $X(u)<X(v)$:
10. $X(b_e)=X(u)+1$
11. Else:
12. $X(b_e)=X(u)-1$
13. $Y(b_e)=Y(v)-1$
14. Draw e with one bend at point $(X(b_e),Y(b_e))$ Computing the Channels or Paths (Step 603)

The simplest way to compute a path/channel decomposition is to compute vertex-disjoint paths. For example, compute the longest path, then remove from the graph all nodes in the path, compute a longest path in the remaining graph, and so on. Another way is to compute vertex disjoint paths simultaneously, in parallel.

There are more complicated algorithms that compute optimum path decompositions [KPG+18] and optimum channel decompositions, where the channels are not (necessarily) paths, see [J90, CC14].

Figure 10:
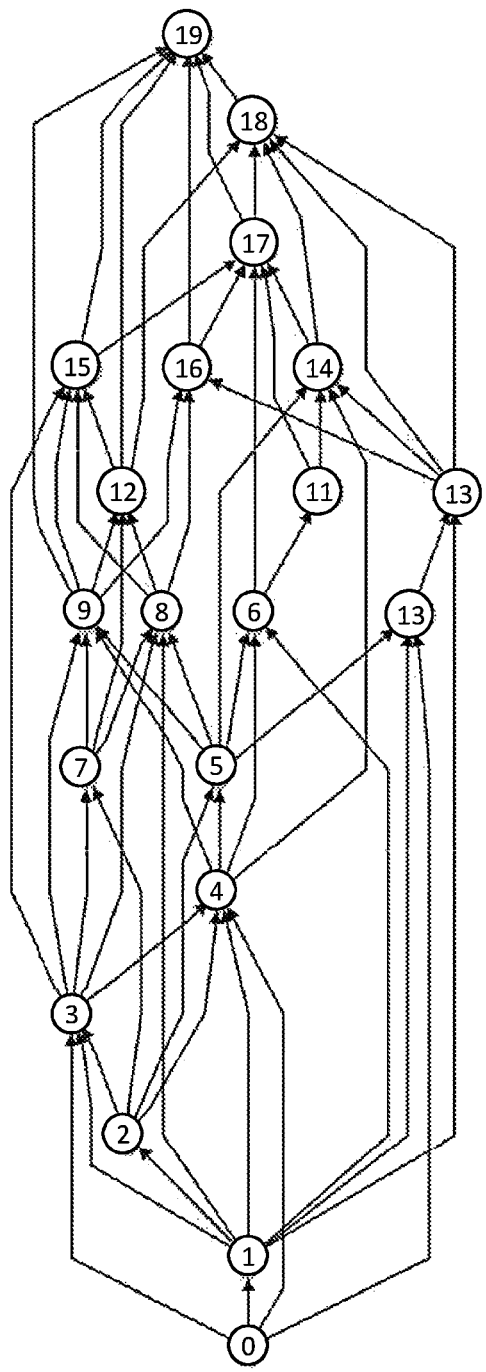
FIG. 10 is a drawing of a directed acyclic graph G4 computed by Tom Sawyer Perspectives from Tom Sawyer Software.
Figure 11:
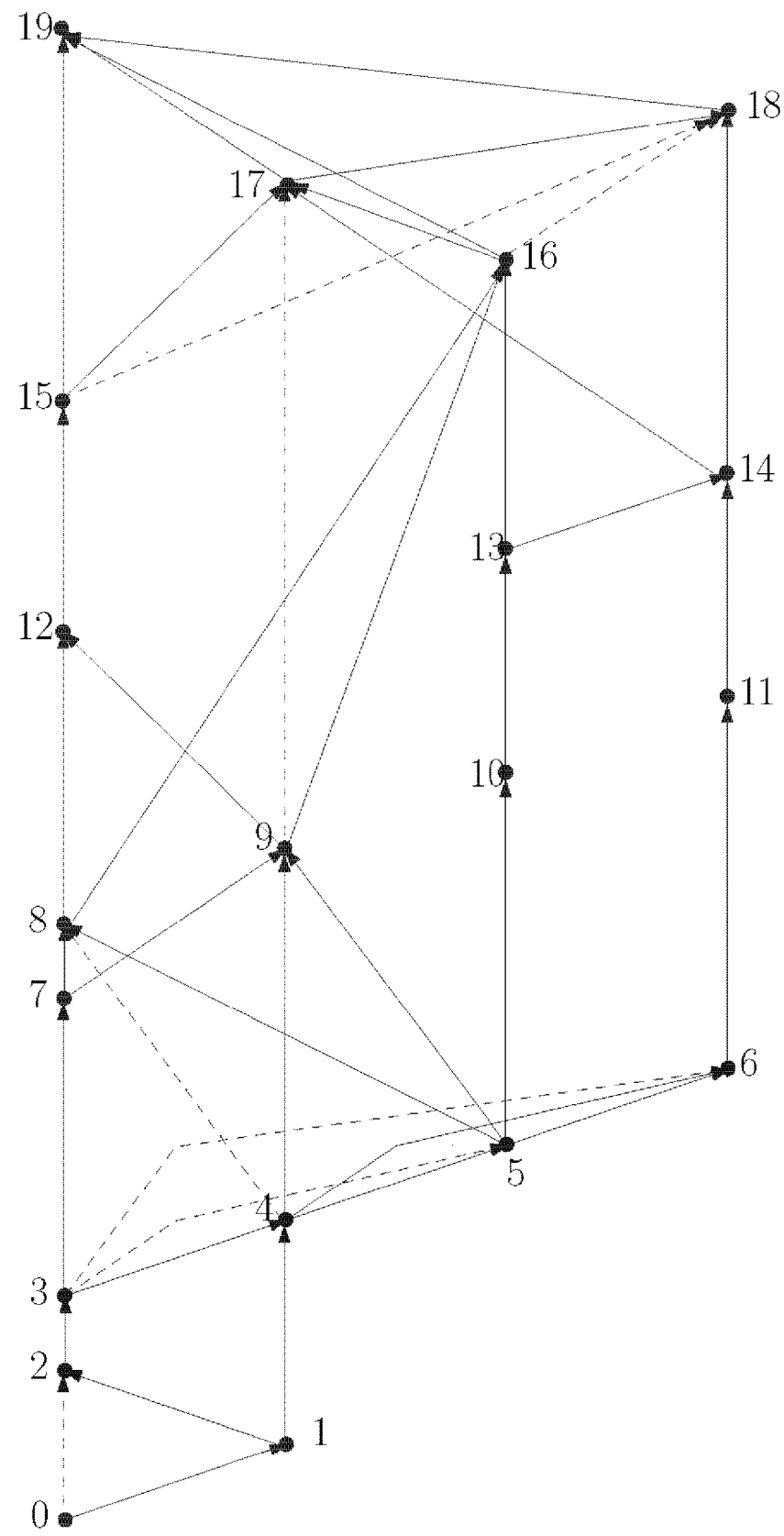
FIG. 11 is a path-based drawing of the graph of FIG. 10 in accordance with present methods.

FIG. 10 shows the original graph G drawn as computed by Tom Sawyer Perspectives that uses the Sugiyama framework. A channel decomposition of this graph is $S_c=\{C_1,C_2,C_3,C_4\}$, where: $C_1=\{0,2,3,7,8,12,15,16,19\}$; $C_2=\{1,4,9,17\}$; $C_3=\{5,10,13,18\}$; $C_4=\{6,11,14\}$. FIG. 11 shows the drawing of Q as computed by Algorithm CB-Draw. The dashed edges are edges that do not exist in G. Some channel edges, such as (0, 2) and (9, 17) are dashed because they are not edges of the original graph. This is the case since a channel may not be a path of G.

Given any path/channel decomposition of a graph G, Algorithms PB-Draw and CB-Draw can draw G by assigning coordinates to vertices and bends. Then the edges are drawn trivially by drawing straight-line segments between vertices, or vertices and bends.

Advantages of the present framework include: (a) it does not introduce any dummy vertices, (b) it keeps the vertices of a channel (or path) vertically aligned, (c) it reduces the number of crossings between cross edges and channels, (d) the number of bends is very low, (e) it requires area at most $O(kn)$, and (f) offers answers to reachability queries between vertices by traversing at most one cross edge.

The total time complexity of the present framework, including the time for computing the necessary channel- or path-decomposition is, in some embodiments, $O(nm)$. If there is a requirement to compute the absolute minimum number of crossings between cross edges and paths/channels (not often required in practice) then the time is exponential in k, by trying all possible permutations of paths/channels. However, some heuristic variations of the method can be made to run in linear time.

Exemplary Hardware Environment

Figure 9:
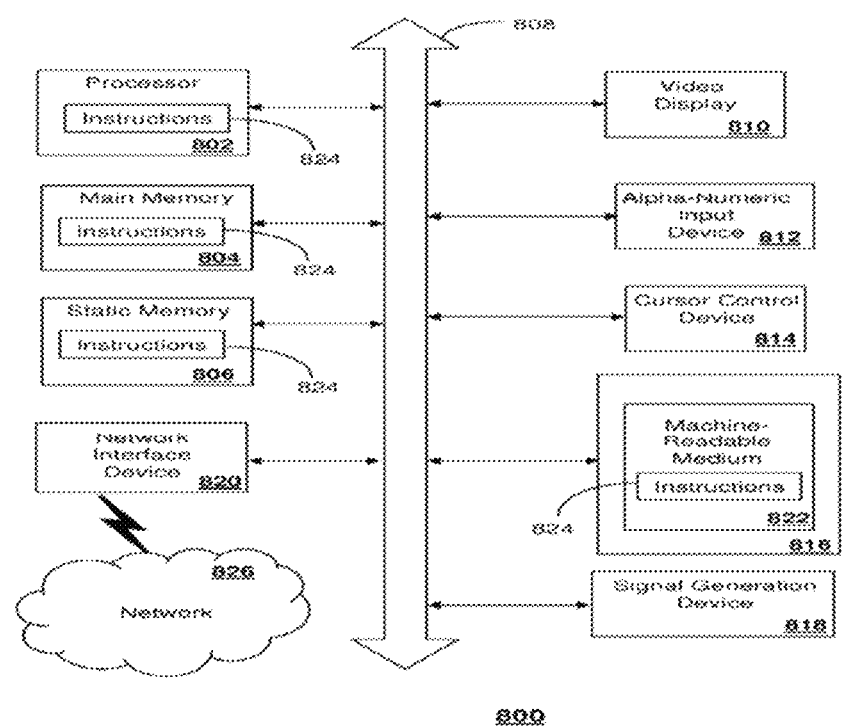
FIG. 9 is a diagram of a computer system with which the present invention may be used.

FIG. 9 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a mobile phone, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU)), a graphics processing unit (GPU, or both), a main memory 804, and a static memory 806, which communicate with each other via a bus 808. The computer system 800 may further include a video display unit 810 (e.g., a liquid crystal display (LCD), a flat panel, a solid-state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control), and a network interface device 820.

The disk drive unit 816 may include a computer-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application-specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations that include, but are not limited to, distributed processing or component/object distributed processing, parallel processing, or virtual machine processing can also be constructed to implement the methods described herein.

The present disclosure contemplates a machine-readable medium containing instructions 824, or that which receives and executes instructions 824 from a propagated signal so that a device connected to a network environment 826 can send or receive voice, video, or data to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

It will be appreciated by those skilled in the art that the present invention may be embodied in other specific forms without departing from the spirit or essential character thereof. The disclosed embodiments are therefore intended in all respects to be illustrative and not restrictive. The scope of the invention is indicated by the appended claims rather than the foregoing description, and all changes that come within the scope and range of equivalents thereof are intended to be embraced therein.

What is claimed is:

1. A computer implemented graph drawing method for producing a hierarchical drawing of a directed acyclic graph of vertices and edges in which vertices of the graph are vertically decomposed into paths/channels and cross edges connect various vertices in different paths/channels, comprising:
   (a) performing a transformation from a graph representation in which edges are not shared to a transformed graph representation in which vertices remain separate and distinct but at least some edges are shared, comprising a channel decomposition and hierarchical drawing step and;
   (b) displaying the transformed graph representation;
   wherein vertices of the graph are divided into subsets and vertices of each subset are vertically aligned in the transformed graph representation.

2. The method of claim 1, comprising keeping vertices of a path/channel vertically aligned.

3. The method of claim 1, wherein no dummy vertices are introduced.

4. The method of claim 1, wherein reachability information between vertices is represented by traversing at most one cross edge.

5. The method of claim 1, wherein each cross edge has at most one bend.

6. The method of claim 1, wherein an area of the hierarchical drawing is O(kn) and is bounded by a rectangle of height n- 1 and width O(k), where k, the number of paths/channels is typically a constant or small fraction of n.

7. The method of claim 1, wherein a number of crossings between cross edges and paths/channels can be minimized in $O(k!k^2)$ time.

8. The method of claim 1, wherein no cross edge e=(u,v) intersects a vertex different from u and v in the hierarchical drawing.

9. The method of claim 1, comprising allowing user-defined paths to be drawn vertically aligned.

10. The method of claim 1 wherein, for a subset of cross edges, at most one bend is introduced.

11. The method of claim 1, wherein total time complexity of the graph drawing method is O(km), where k is the number of paths/channels, and m is the number of edges.

12. The method of claim 1, wherein at least some of the vertices are labeled to aid visual identification of the vertices by a user.

13. The method of claim 12 wherein the order goes from left to right or from right to left in accordance with user input.

* * * * *